219-121

United States Patent Office 3,490,116
Patented Jan. 20, 1970

3,490,116
MANUFACTURE OF BRAZING ALLOYS IN STRIP FORM OR THE LIKE
Arthur T. Cape, Monterey, Calif., assignor to Coast Metals, Inc., Little Ferry, N.J., a corporation of Delaware
No Drawing. Filed May 9, 1967, Ser. No. 637,092
Int. Cl. B21d 33/00
U.S. Cl. 29—18
4 Claims

ABSTRACT OF THE DISCLOSURE

This invention is concerned with the manufacture from powder of difficultly-rollable strip or foil by melting the powder by means of a plasma jet and depositing it onto an aluminum substrate, from which the strip or foil is subsequently stripped.

---

This invention relates generally to the manufacture of alloys, but has reference more particularly to the preparation of such alloys in a convenient strip or foil form, which is adaptable for certain types of brazing.

There are certain types of brazing alloys which are not essentially brittle, but are nevertheless difficult to form or roll into strip or foil.

For example, nickel-base brazing alloys, contains silicon and boron in amounts up to about 6% each, such, for example, as those covered by AMS specifications, Nos. 4475, 4476, 4477 and 4478, and which are normally sold in the form of powders, would be extremely advantageous if available in the form of strip or foil, but their compositions are such as to make the manufacture of such strip or foil impractical by ordinary or conventional methods of rolling or forming.

Due to the high temperatures, i.e., above 15000° F., attained with a plasma jet or torch, alloys in powder form have been sprayed by such jets or torches onto various parts, as a coating material, the powder being converted into a fluid or plastic state, which is sprayed at a high velocity as to become firmly bonded to the part.

In Brennan Patent No. 2,864,137, a highly reactive metal, such as titanium, or nickel carbonyl powder, is melted and deposited onto a rotating cooled drum of unspecified metal to form a coating on the drum, which is then stripped, as by means of a knife, from the drum.

In Fig. 7 of the Brennan patent, the powder particles pass through a high frequency field and are stated to be heated by this field until they become molten. However, the deposited material is still in particulate form, and it is necessary to use additional coils of very high frequency to cause fusion of the deposited material, as well as densifying rollers to densify the sheets. Thus, the fusing and densifying of the deposited material is obtained by successive applications of high frequency fields to the surface of the material.

I have found that nickel-base brazing alloys, containing silicon and boron in amounts up to about 6% each, in powder form, can be melted and sprayed, as by means of a plasma jet or torch, onto a substrate, such as aluminum, and the alloy then stripped or peeled from the substrate, in the form of a strip or foil, which can then be used for brazing purposes.

In my method, the powder, due to the high temperature of the plasma jet, and the high velocity of the particles, is immediately converted into a fluid or plastic state, so that they form a dense, non-porous strip or foil, and it is not necessary to reheat or densify the deposited material, as required in the Brennan patent.

However, in order to prevent the strip or foil from becoming bonded to the substrate, I use, as the substrate, a slab or plate of aluminum, having a minimum thickness of about ½ inch, and manipulate the plasma torch backwards and forwards until a layer of the requisite thickness, length and width of strip or foil has been deposited.

The use of a slab or plate of aluminum is essential in my process, because the thin aluminum oxide film which is always present on such a slab or plate prevents the deposited material from becoming fused to the slab or plate, even at the high temperature at which the plasma jet operates.

Following the deposition of the strip or foil, the strip or foil can be easily pulled off the slab or plate by merely gripping one end thereof and pulling it off.

In this manner, I have been able to produce strip or foil of a thickness of .0015″ to .006″, without the necessity of water cooling the aluminum slab or plate.

Attempts to form strip or foil in this manner, utilizing a substrate of copper or stainless steel have proven unsatisfactory.

The invention is also applicable to the manufacture of other alloys which are difficult to roll or form ito strip or foil, such, for example, as cobalt-base brazing alloys, iron-base brazing alloys, manganese-base brazing alloys, and copper-base brazing alloys.

Cobalt-base brazing alloys, such, for example, as those described in my U.S. Patents Nos. 2,801,165 and 3,265,494, the Stellites, and Colmonoy 157, may be manufactured in strip or foil form, in the manner described.

Iron-base brazing alloys, such as those described in my U.S. Patent No. 2,422,948, may be manufactured in strip or foil form, in this manner.

Magnanese-base brazing alloys, such as those described in my U.S. Patent No. 3,124,451, may be manufactured in strip or foil form, in this manner.

Copper-base brazing alloys, such as those described in my U.S. Patents Nos. 3,197,859 and 3,198,609, may also be manufactured in strip or foil form, in this manner.

4. The method, as defined in claim 1, wherein the deposited strip or foil has a thickness of from .0015" to .006."
References Cited
UNITED STATES PATENTS
| | | | |
|---|---|---|---|
| 3,077,659 | 2/1963 | Holzwarth et al. | 117—105.2 |
| 3,139,658 | 7/1964 | Brenner | 164—46 |
| 3,181,209 | 5/1965 | Smith | 164—46 |
| 3,270,381 | 9/1966 | Smith | 164—46 |
| 3,310,423 | 3/1967 | Ingham | 117—105.2 X |
OTHER REFERENCES
"The Plasma Jet and Its Uses," by M. L. Thorpe, Research/Development, January 1960, pp. 5–9, 11, 12 and 15 (pp. 5, 6 and 12 relied upon).
PAUL M. COHEN, Primary Examiner
U.S. Cl. X.R.
117—105; 164—46; 219—121
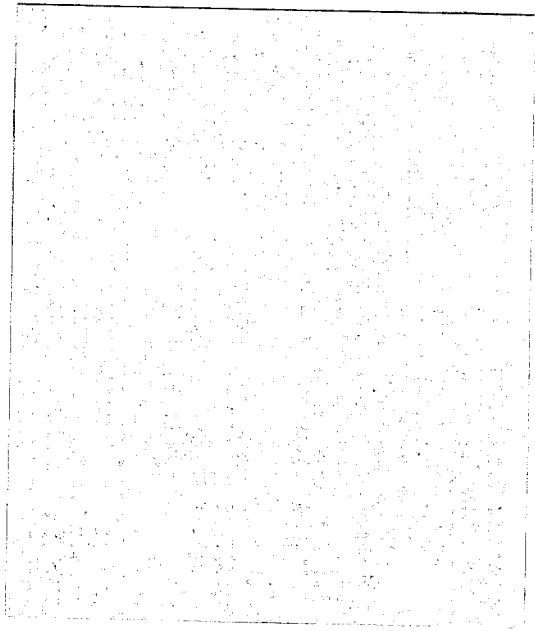

Having thus described my invention, I claim:

1. The method of making in strip or foil form brazing alloys selected from the group consisting of difficultly rollable nickel-base, cobalt-base, iron-base, manganese-base and copper-base brazing alloys which comprises melting and spraying by means of a plasma jet the alloy in powder form onto a substrate of aluminum, whereby the sprayed material forms a dense non-porous strip or foil on the substrate without becoming bonded to the substrate, and then stripping the strip or foil thus formed from the substrate.

2. The method, as defined in claim 1, wherein the substrate is a slab or plate of aluminum having a thickness of at least about ½ inch.

3. The method, as defined in claim 1, wherein the substrate has a thin film of oxide on its surface which prevents the strip or foil from becoming bonded to the substrate.